United States Patent Office 2,865,481
Patented Dec. 23, 1958

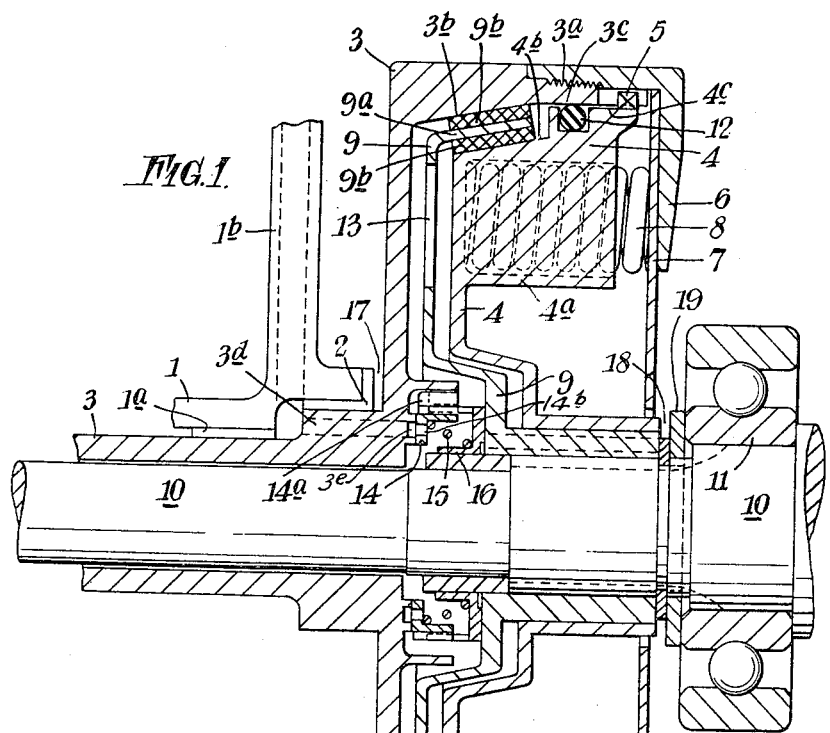
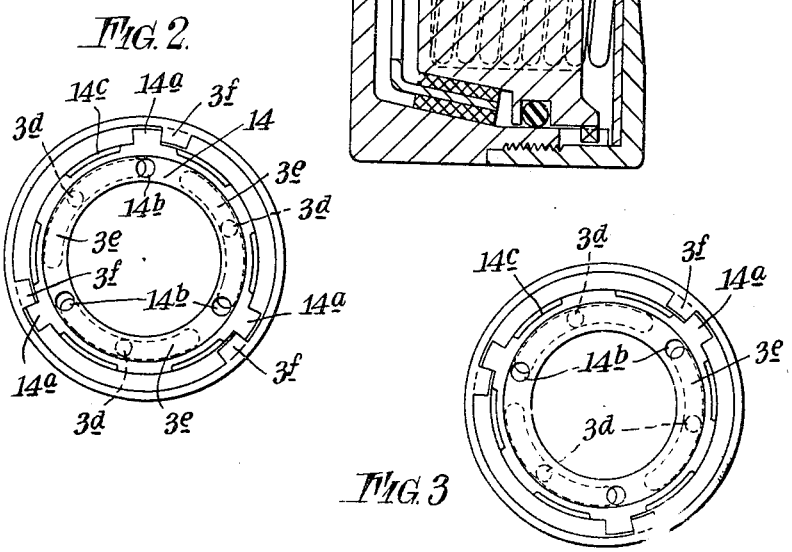

2,865,481

FLUID OPERATED FRICTION CLUTCH WITH CUSHION

Piero Mariano Giri de Teramala, Cox Green, England

Application November 30, 1953, Serial No. 395,214

Claims priority, application Great Britain December 5, 1952

2 Claims. (Cl. 192—91)

This invention relates to a friction clutch of the kind adapted to transmit torque from one shaft to another co-axial therewith. A clutch made according to this invention is capable of transmitting a large torque in relation to its size, it can be held disengaged for prolonged periods without undue wear taking place and there are provided means whereby re-engagement takes place always without shock, and means whereby when the engaging parts of the clutch are in synchronism such re-engagement takes place rapidly. A clutch according to this invention is particularly suitable for use in power transmission apparatus for a vehicle including a hydraulic torque converter and a mechanical gear and may conveniently be placed between the turbine of the torque converter and the input shaft of the mechanical gear, which latter may be of conventional synchromesh or epicyclic type. In such a case the clutch may be required to transmit a torque amounting to three or more times the maximum torque developed by the engine but must nevertheless be smooth in take up even when operated by an unskilled driver.

In a friction clutch of the kind to which the invention relates one shaft is connected to two co-rotating members adapted to be moved towards and away from each other in an axial direction such relative movement in at least one direction being caused by the use of fluid under pressure, which operating fluid exerts pressure on each of the two co-rotating members respectively in opposite directions. Preferably part of the one co-rotating member is formed as a cylinder and part of the other co-rotating member is formed as a cooperating piston, the operating fluid being introduced into the cylinder so as to cause relative movement between the piston and the cylinder. The other shaft is connected to a third member, and the arrangement is such that as the two co-rotating members move relatively to each other frictional engagement or disengagement is effected between the two co-rotating members and the third member. By "co-rotating" is meant that the two members always rotate together in synchronism. The third member is preferably situated between the two co-rotating members. The two co-rotating members may be connected to the power input shaft of the clutch, in which case the third member is connected to the power output shaft. In a convenient arrangement the two co-rotating members may be caused to approach each other and grip the third member between them under the influence of a spring (which word includes a number of springs in combination) whereby engagement of the clutch is effected, and disengagement may be effected by introducing fluid under pressure which overcomes the force of the spring and causes the two co-rotating members to separate and thereby free the third member, but the invention is not limited to this particular arrangement.

According to this invention control means are provided whereby engagement of the clutch must occur slowly when the respective engaging members are rotating at substantially different speeds but the arrangement is such that if a reversal of relative motion between the driving and driven shafts occurs so that at least for a short time their speeds are substantially the same a quick engagement can be effected.

Other features of the invention will be apparent from the following detailed description of one embodiment of the invention, by way of example, and from the claims.

Referring to the accompanying drawings:

Figure 1 represents a section of a clutch according to this invention,

Figure 2 is a sectional view of the synchronizing means which are shown in one limiting position, Figure 3 is a view similar to Figure 2 but showing the synchronizing means in the other limiting position.

1 represents a part of the fixed frame in which the clutch is supported. Upon the shaft driven by the prime mover such as the turbine of a hydro-kinetic torque converter (which shaft is not shown) there is splined a member 3, supported within the frame 1 by a suitable bearing 1a, so that the member 3 always rotates with such power input shaft but is capable of movement in the axial direction relative to it. A member 4 is connected by splines indicated at 5 and situated near the periphery of the clutch to the member 3 so that these members can move towards and away from each other in the axial direction but always rotate together in synchronism. The members 3 and 4 are herein referred to as co-rotating members. An extension piece 6 is screwed or otherwise secured at 3a to the member 3 and an annular liner 7 is positioned within the said extension piece 6, the purpose of which liner is hereinafter explained.

A helical spring 8 is housed within a suitably shaped cavity 4a in the outer wall of the member 4 and is held between the base of the said cavity 4a and the extension piece 6, tending to press these parts away from each other and therefore causing the conical friction faces 3b and 4b on the members 3 and 4 to approach each other. A member 9 is splined on the power output shaft 10 which is supported in the bearing 11. The member 9 has a conical portion 9a faced on either side with friction material 9b adapted to effect frictional engagement with the friction faces 3b, 4b of the members 3, 4 respectively, so as to cause the clutch to become engaged and power to be transmitted from the power input shaft to the power output shaft 10. The angle of the cones may be made small, for example 15°, as in a clutch according to this invention ample disengaging movement may be provided to ensure full disengagement notwithstanding so small an angle of the cones.

A portion 3c of the internal face of the member 3 is formed as a cylinder and co-operates with a portion 4c of the exterior surface of the member 4, which acts as a piston, a suitable packing ring 12, or the like, being interposed to provide a substantially fluid tight arrangement. Openings 13 are provided in the member 9 to permit fluid to flow freely from one side thereof to the other.

In order to cause the clutch to become disengaged, fluid under pressure is introduced into the space between the members 3 and 4 so as to cause the friction faces 3b and 4b of these members to move apart from each other. This can conveniently be done by leading the fluid from a suitable source of supply (not shown, but being, for example, an auxiliary pump) through a conduit 1b formed in the member 1 and thence through conduits 3d in the member 3. An anti-fritcion fluid sealing annular member 2 is provided between the member 1 and the member 3. The fluid enters the space between the members 3 and 4 past an annular flap valve 14. The ends of the conduits 3d communicate with interrupted annular grooves 3e constituting ports for the passage of liquid formed in the face of the member 3 and equidistantly spaced from each other as shown in Figures 2 and 3.

The flap valve 14 and a co-operating seat therefor formed on the face of the member 3 are so constructed that the flap valve is carried by the member 3 and when seated covers the grooves 3e. The flap valve is capable of partial rotation relative to the member 3, such rotation being limited by radially extending tongues 14a on the flap valve co-operating with lugs 3f on the carrying member 3, which lugs 3f extend radially inwardly. In Figure 2 the flap valve 14 is shown rotated clockwise relative to the carrying member 3 to one limiting position and in Figure 3 the flap valve 14 is shown rotated anti-clockwise relative to the carrying member 3 to the other limiting position. The flap valve 14 has orifices 14b and the tongues 14a, lugs 3f, grooves 3e and orifices 14b are so positioned and constructed that in a limiting position the orifices 14b are not in register with or, as shown, only in partial register with the grooves 3e, but in intermediate positions of the flap valve the orifices 14b are fully in register with the grooves 3e.

By "capable of partial rotation" is meant that in any embodiment the amount of relative rotation between the flap valve and the carrying member 3 is always less than one revolution and is such that each orifice 14b (or the orifice if there be only one) is brought from a position clear of, or just overlapping one end of the corresponding groove 3e to a position clear of, or just overlapping, the other end of that groove.

The flap valve 14 is rotationally connected to a coaxial member 16 by splines 14c, which member 16 frictionally presses against the member 9. The spring 15 is situated between the members 14 and 16 and the arrangement is such that while the spring 15 tends to maintain the members 14 and 16 constantly in contact with the members 3 and 9 respectively, relative movement in the axial direction between the members 3 and 9 is accommodated by similar relative movement in the axial direction between the members 14 and 16. The frictional force between the member 16 and the member 9 is made greater than the frictional force between the member 14 and the member 3, for example by making the area of contact in the former case larger than in the latter.

The operation of the parts so far described is as follows: Assume that the power input shaft and therefore the member 3 is being driven by some prime mover and that the clutch is engaged, the friction faces 3b and 4b pressing against the friction material fixed on both the co-operating conical faces on the member 9, and that it is desired to disengage the clutch in order to change the ratio of a mechanical change speed gear to which the power output shaft 10 is connected. Fluid under pressure is led by way of the conduits 1b and 3d into the ports or grooves 3e. The flap valve is lifted by the passage of fluid against the pressure of spring 15 and the fluid pressure causes the members 3 and 4 to separate from each other thereby disengaging the member 9 from the grip of the members 3 and 4. Accordingly the shaft 10 becomes disconnected from the power input shaft. As the thrust which causes disengagement is taken up in an internally balanced manner, the clutch may be permitted to remain disengaged for prolonged periods without risk of undue wear and in the case of a vehicle equipped with such a clutch the vehicle may be permitted to "coast" by merely disengaging the clutch. In order to ensure against any inadvertent engagement of the clutch, fluid under pressure may continue to be supplied to compensate for any leakage during the whole period the clutch is required to remain disengaged. In general the power input shaft and the shaft 10 will on disengagement continue to rotate but at different speeds. Assuming that the shaft 10 is now rotated through its associated mechanical gear faster than the power input shaft is rotated by the prime mover and that the direction of rotation is clockwise as seen in Figures 2 and 3, the member 16 will tend to rotate the flap valve 14 clockwise, bringing the same into the position shown in Figure 2. Slipping will now occur between the member 9 and the member 16. When it is desired to re-engage the clutch the fluid pressure is released at a suitable point so that the fluid in the conduit 1b is no longer under pressure. The action of the spring 8 will tend to cause the members 3 and 4, and therefore the faces 3b and 4b, to approach each other, the fluid requiring to be expelled from between the members 3 and 4 in order to permit re-engagement between the engaging members 3 and 4 on the one hand and the complementary engaging member 9 on the other. The flap valve 14 will now seat firmly on its carrying member 3, covering the ports or grooves 3e except for the small opening that may exist by reason of the orifices 14b overlapping the ends of the grooves 3e. The fluid will accordingly escape only slowly, the actual rate of escape depending on whether the orifices 14b are wholly out of register with the grooves 3e, so that escape will be very slow, being due entirely to leakage, or whether some overlap between the orifices and the ends of the grooves has been provided. The clutch will accordingly become engaged slowly and the amount of the said overlap (if any) will be predetermined so as always to ensure a sufficiently slow engagement, having regard to the nature of the apparatus as a whole, to avoid undue shock on re-engagement of the clutch. If after the fluid pressure has been released, but before the clutch has become fully engaged, the power input shaft and therefore the member 3, is speeded up so as to rotate just faster than the shaft 10, the latter will have a relative rotation in the anti-clockwise direction and the flap valve 14 will be turned anti-clockwise so as to bring the orifices 14b into full register with the grooves 3e. The fluid will then escape freely and rapidly and the clutch will become re-engaged very rapidly but again without shock, as the engaging members 3, 4 and 9 will be rotating at substantially the same speed. Engagement without shock will similarly occur if on disengagement the power input shaft and the member 3 rotate faster than the shaft 10, the position of the flap valve when the clutch is disengaged being in that case as shown in Figure 3.

Preferably the members 3 and 4 are so designed that the total pressure exerted on each by the fluid is equal and opposite so that each of these members moves simultaneously and to the same extent. The permitted amount of movement is controlled by the gaps 17 and 18 between the member 3 and the member 2 and between the member 4 and an abutting member 19 respectively. Preferably the member 9 is so mounted as to be incapable of axial movement.

The purpose of the annular liner 7 which cooperates structurally with members 4 and 6 to define an open and annular chamber, is to enable a quantity of additionally supplied fluid to be received due to centrifugal force and to be retained between liner 7 and the member 4. When the clutch is rotating this retained fluid is placed under pressure by the action of centrifugal force and the fluid pressure so developed tends to reinforce the effect of the spring 8, thereby neutralizing the tendency of the fluid between the members 3 and 4 to cause the clutch to disengage when such fluid is subjected to centrifugal force.

It will be observed that in the embodiment described and illustrated the spring 8, being held between the outside wall of the member 4 and the extension piece 6 attached to the member 3, is situated wholly outside the space between the members 3 and 4, into which space fluid under pressure is introduced, and from which space fluid is allowed to escape, in order to operate the clutch (which space is hereinafter called "the operating chamber"). Accordingly the size and configuration of the spring is independent of the dimensions of the operating chamber. Furthermore the spring may be made very strong, as ample power can be exerted by means of the operating fluid to overcome a strong spring and disengage the clutch and such power is applied in a substantially frictionless manner. The possibility of having in combination a very strong spring and a small cone angle enables a clutch according to this invention to be designed to transmit a large torque for its size as compared with a clutch of normal construction.

I claim:

1. A fluid operated friction clutch comprising a pair of co-rotating friction clutch elements movable axially towards and away from each other and connected to a power input shaft, a central member disposed between said clutch elements and frictionally held therebetween, said central member being connected to a driven shaft and restricted against axial displacement, a thrust-receiving member connected to one of said co-rotating clutch elements, a complementary thrust-receiving member on the other of said co-rotating clutch elements, said one clutch element forming an exterior casing surrounding the engaging parts of the clutch and constituting a cylinder to receive the other clutch element as a piston slidable therein, spring means for holding said thrust-receiving members apart and for urging the co-rotating clutch elements towards said central member and into frictional engagement therewith to engage the clutch, fluid pressure operated means adapted to effect axial displacement of said co-rotating clutch elements in opposite directions to compress said spring and to effect disengagement with said central member and a fluid release valve adapted to relieve the pressure between the co-rotating clutch elements and to cause said spring to separate said thrust-receiving members, said pressure release valve being a flap valve mounted for rotation relative to a first one of said clutch elements and a member rotationally connected to said flap valve and in frictional engagement with said central member, and stop means on said first clutch element and on said flap valve whereby said valve will be rotated relative to said first clutch element to one of two limiting positions when said central member is rotating at a substantially different speed than said first clutch element but is brought to an intermediate position upon a reversal of the direction of relative rotation, said flap valve and first clutch element having passage means therethrough controlled by the position of said flap valve.

2. A fluid operated friction clutch as claimed in claim 1 wherein said passage means include orifices provided in said flap valve and ports in said first clutch element cooperating with said orifices to control the rate at which fluid escapes.

References Cited in the file of this patent

UNITED STATES PATENTS

| | | |
|---|---|---|
| 1,270,794 | Dawson | July 2, 1918 |
| 2,164,865 | Keiper | July 4, 1939 |
| 2,529,423 | Schou | Nov. 7, 1950 |
| 2,543,252 | Nabstedt et al. | Feb. 27, 1951 |
| 2,575,765 | Nabstedt et al. | Nov. 20, 1951 |
| 2,576,336 | Farkas | Nov. 27, 1951 |
| 2,645,135 | Frank | July 14, 1953 |
| 2,684,742 | Eason | July 27, 1954 |
| 2,766,864 | Schilling | Oct. 16, 1956 |

FOREIGN PATENTS

| | | |
|---|---|---|
| 726,652 | Germany | Oct. 17, 1942 |
| 819,186 | Germany | Oct. 31, 1951 |